United States Patent
Peter-Hoblyn et al.

(10) Patent No.: US 6,361,754 B1
(45) Date of Patent: Mar. 26, 2002

(54) REDUCING NO EMISSIONS FROM AN ENGINE BY ON-DEMAND GENERATION OF AMMONIA FOR SELECTIVE CATALYTIC REDUCTION

(75) Inventors: Jeremy D. Peter-Hoblyn, Cornwall (GB); Eric N. Balles, Carlisle, MA (US); John E. Hofmann, Naperville, IL (US)

(73) Assignee: Clean Diesel Technologies, Inc., Stamford, CT (US)

( * ) Notice: Subject to any disclaimer, the term of this patent is extended or adjusted under 35 U.S.C. 154(b) by 0 days.

(21) Appl. No.: 08/826,165

(22) Filed: Mar. 27, 1997

(51) Int. Cl.⁷ ............................ B01D 53/54; B01D 53/60
(52) U.S. Cl. ................... 423/213.2; 60/274; 422/169; 422/171; 422/177; 422/189; 423/239.1
(58) Field of Search .................... 60/274, 277, 280, 60/286, 282, 295, 299, 301; 423/235, 239.1, 212, 213.2, 213.5, 169, 171, 177, 189

(56) References Cited

U.S. PATENT DOCUMENTS

| | | | |
|---|---|---|---|
| 4,107,272 A | 8/1978 | Mori et al. | 423/239 |
| 4,268,488 A | 5/1981 | Ginger | 423/239 |
| 4,891,050 A | 1/1990 | Bowers et al. | 44/67 |
| 4,892,562 A | 1/1990 | Bowers et al. | 44/67 |
| 4,997,631 A | 3/1991 | Hofmann et al. | 423/235 |
| 5,034,020 A | 7/1991 | Epperly et al. | 44/358 |
| 5,132,103 A * | 7/1992 | Schoubye | 423/239 |
| 5,139,754 A | 8/1992 | Luftglass et al. | 423/235 |
| 5,215,652 A | 6/1993 | Epperly et al. | 208/140 |
| 5,240,688 A * | 8/1993 | Von Harpe et al. | 423/235 |
| 5,266,083 A | 11/1993 | Peter-Hoblyn et al. | 44/358 |
| 5,281,403 A * | 1/1994 | Jones | 423/235 |
| 5,431,893 A | 7/1995 | Hug et al. | 423/234.1 |
| 5,540,047 A * | 7/1996 | Dahlheim et al. | 60/274 |
| 5,628,186 A * | 5/1997 | Schmelz | 60/274 |

FOREIGN PATENT DOCUMENTS

| | | |
|---|---|---|
| CA | 1100292 | 5/1981 |
| EP | 0 615 777 A1 | 2/1994 |
| JP | 2-191528 | 7/1990 |
| WO | 90/07561 | 7/1990 |
| WO | 92/02291 | 2/1992 |

OTHER PUBLICATIONS

Havenith, Cornelis, Verbeek, Ruud P., "Transient Performance of a Urea deNOx Catalyst for Low Emissions Heavy–Duty Diesel Engines", SAE Paper 970185, International Congress & Exposition, Detroit, MI, Feb. 24–27, 1997.

* cited by examiner

Primary Examiner—Steven P. Griffin
Assistant Examiner—Maribel Medina
(74) Attorney, Agent, or Firm—Ware, Fressola, Van Der, Sluys & Adolphson LLP

(57) ABSTRACT

A safe, reliable SCR system for reducing $NO_x$ emissions from an internal combustion engine hydrolyzes urea or like reagent under sufficient pressure to assure generation of ammonia, without production of solids that could foul injectors or catalysts. The heat for hydrolysis can be provided by the exhaust or an auxiliary means.

13 Claims, 2 Drawing Sheets

REDUCING NO EMISSIONS FROM AN ENGINE BY ON-DEMAND GENERATION OF AMMONIA FOR SELECTIVE CATALYTIC REDUCTION

TECHNICAL FIELD

The invention relates to means and methods that enable the safe and reliable reduction of nitrogen oxides ($NO_x$) emissions while permitting a diesel or other lean-burn engine to operate efficiently.

Diesel and lean-burn gasoline engines provide advantages in fuel economy, but produce both $NO_x$ and particulates during normal operation. When primary measures (actions that affect the combustion process itself, e.g., exhaust gas recirculation and engine timing adjustments) are taken to reduce one, the other is usually increased. Thus, combustion conditions selected to reduce pollution from particulates and obtain good fuel economy tend to increase $NO_x$.

Current and proposed regulations challenge manufacturers to achieve good fuel economy and reduce particulates and $NO_x$. Lean-burn engines will be necessary to achieve the fuel economy objective, but the high concentrations of oxygen in the exhaust renders typical exhaust gas catalyst systems ineffective for reducing $NO_x$.

SCR (selective catalytic reduction) has been available for years in some contexts for reducing $NO_x$. To date, however, SCR has depended on the use of ammonia, which has safety problems associated with its storage and transport. Urea is safer, but has not been practical for many SCR applications—particularly mobile $NO_x$ sources—due to the difficulty in converting it from a solid or an aqueous form to its active gaseous species, typically $NH_i$ and HNCO radicals.

There is a current need for a safe, economical and effective answer to the problems associated with urea SCR, particularly for mobile diesel and other lean-burn engines.

BACKGROUND ART

Where SCR catalysts are employed to limit $NO_x$ emissions from diesel engines, one has to deal with either the dangers of ammonia or a risk of fouling the catalysts under most conditions. In this regard, see R. J. Hulterman; A Selective Catalytic Reduction Of $NO_x$ from Diesel Engines Using Injection Of Urea, Ph.D. thesis, September 1995. Hulterman describes a number of technical challenges including clogging of atomizers, decomposition problems and system dynamics. Similarly, in SAE Paper No. 970185, entitled "Transient Performance of a Urea DeNOx Catalyst for Low Emissions Heavy-Duty Diesel Engines", it is indicated that the injection nozzles must protected from undue heat.

The limited attempts to use urea SCR for diesel engines have required the use of large pyrolization chambers or other devices following the point of urea introduction into the exhaust, as disclosed in U.S. Pat. No. 5,431,893, to Hug, et al. Equipment of this type highlights the known problems with urea. Once introduced into diesel exhaust, urea takes time to break down and may cause nozzle plugging as conventionally introduced and still as proposed in that disclosure. To protect the catalyst from fouling, Hug, et al., propose bulky equipment. In addition, this disclosure highlights the necessity of maintaining the urea solution at a temperature below 100° C. to prevent hydrolysis prior to passage through the nozzle. They propose the use of moderate urea pressures when feeding the urea and find it necessary to have alternative means to introduce high-pressure air into the feed line when it becomes plugged, The nozzles employed by Hug, et al., are apparently capable of producing moderately-fine sprays, the dispersion of which is aided by auxiliary air, but the droplets are still large enough to require a large pyrolization channel.

Each of the points of caution by these references about the difficulties of using urea with SCR systems, especially for mobile sources, points to the trouble the art has had and continues to have.

The art is awaiting the development of a process and apparatus that would permit the use of urea in an SCR process simply, reliably, economically and safely.

DISCLOSURE OF INVENTION

It is an object of the invention to provide a safe, reliable SCR system for reducing $NO_x$ emissions from an internal combustion engine.

It is another object of the invention to eliminate the safety problems associated with the storage and handling of ammonia for mobile uses.

It is another object of the invention to provide a simple, robust, SCR system capable of rapid response time in order to meet transient conditions prevailing in diesel engines.

It is another object of the invention to enable a use of urea for SCR that avoids wetting of or solids deposition on the catalyst.

It is a yet further and more specific object of the invention to enable the use of urea in an SCR system that enables modulation for exhaust gas temperatures between 180 and 600° C.

It is a yet further and more specific object of the invention to enable the use of urea in an SCR system which enables integration with EMS.

It is yet another specific object of the invention to provide a simple mechanical device for accomplishing the above objects and preferably to enable close coupling of the reagent injection means and the SCR catalyst.

It is another specific object of the invention to decompose urea for use in an SCR system, without the production of HNCO or CO in significant quantities.

These and other objects are achieved by the present invention, which provides an improved process and apparatus for $NO_x$ reduction. The process, in one of its aspects, comprises: supplying an aqueous urea solution at a preset, elevated pressure, e.g., of from about 50 to 600 psi, into a vessel having an inlet and an outlet; heating the urea solution in the vessel at a temperature above the hydrolysis temperature for the urea solution to produce ammonia; releasing ammonia from the vessel; introducing the ammonia into the exhaust gas at an exhaust gas temperature effective for SCR, preferably from about 190 to about 650° C.; and passing the exhaust gas containing the ammonia through an SCR reactor.

BRIEF DESCRIPTION OF THE DRAWINGS

The invention will be better understood and its advantages more apparent from the following detailed description, especially when read in light of the accompanying drawings, wherein.

DETAILED DESCRIPTION OF THE PREFERRED EMBODIMENT

Figure 1:
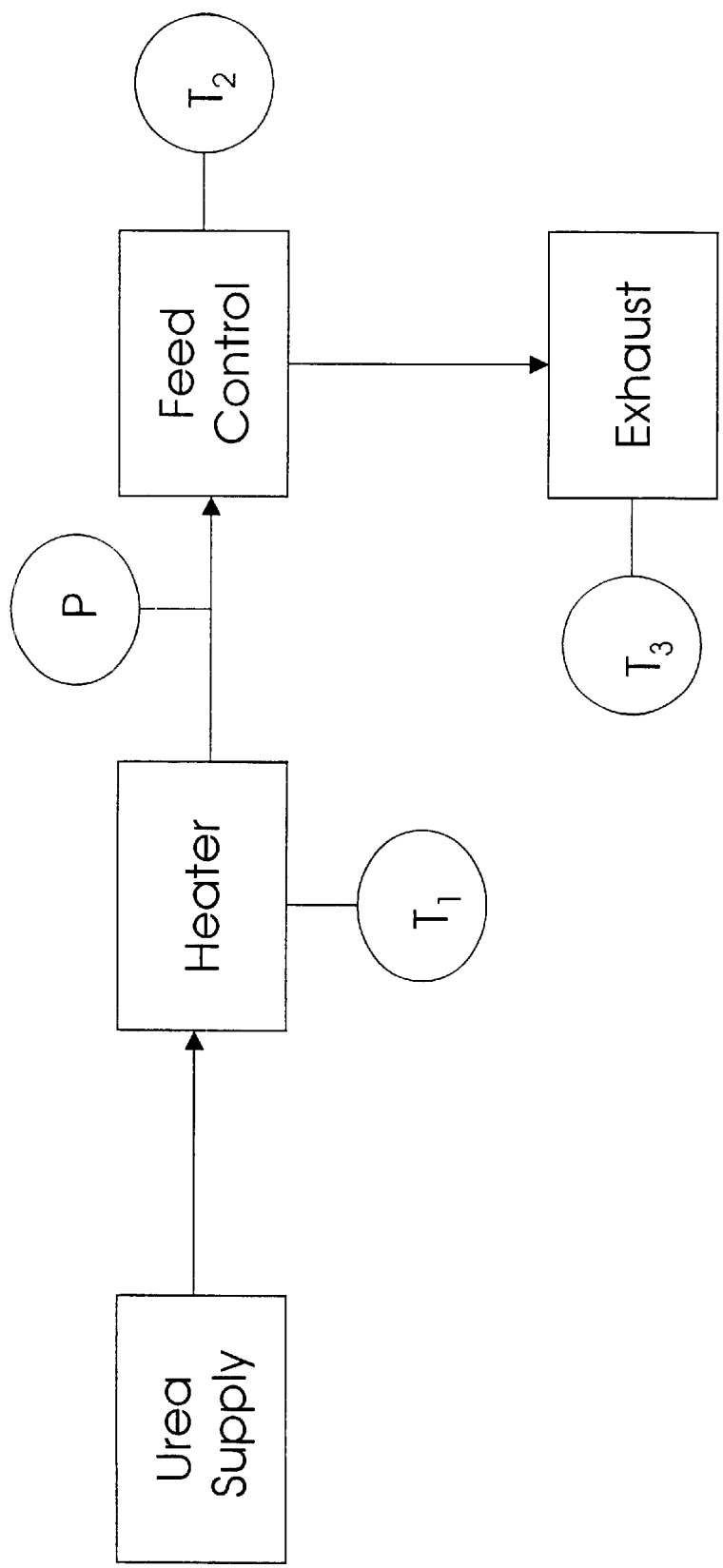
FIG. 1 is a flow diagram showing principal components of one embodiment of the invention.

In this description, the term "lean-burn engine" is meant to include engines that can be operated with an inlet oxygen concentration greater than the amount required for stoichiometric (or chemically correct) combustion, e.g., at least 1% by weight excess oxygen. The term "engine" is meant in the broad sense to include all combustors which combust fuel to provide heat, e.g., for direct or indirect conversion to mechanical or electrical energy. Internal combustion engines of the Otto, Diesel and turbine types, as well as burners and furnaces, are included and can benefit from the invention. However, since the problems and advantages of successful achievement of reliable $NO_x$ reduction on diesel engines are so pronounced, the diesel engine is used throughout this description for purposes of example. Stationary and mobile engines are contemplated.

The term "Diesel engine" is meant to include all compression-ignition engines, for both mobile (including marine) and stationary power plants and of the two-stroke per cycle, four-stroke per cycle and rotary types.

The term "hydrocarbon fuel" is meant to include all of those fuels prepared from "distillate fuels" or "petroleum". Gasoline, jet fuel, diesel fuel, and various other distillate fuels are included. The term "distillate fuel" means all of those products prepared by the distillation of petroleum or petroleum fractions and residues. The term "petroleum" is meant in its usual sense to include all of those materials regardless of source normally included within the meaning of the term, including hydrocarbon materials, regardless of viscosity, that are recovered from fossil fuels.

The term "diesel fuel" means "distillate fuels" including diesel fuels meeting the ASTM definition for diesel fuels or others even though they are not wholly comprised of distillates and can comprise alcohols, ethers, organo-nitro compounds and the like (e.g., methanol, ethanol, diethyl ether, methyl ethyl ether, nitromethane). Also within the scope of this invention, are emulsions and liquid fuels derived from vegetable or mineral sources such as corn, alfalfa, shale, and coal. These fuels may also contain other additives known to those skilled in the art, including dyes, cetane improvers, anti-oxidants such as 2,6-di-tertiary-butyl-4-methylphenol, corrosion inhibitors, rust inhibitors such as alkylated succinic acids and anhydrides, bacteriostatic agents, gum inhibitors, metal deactivators, upper cylinder lubricants, antiicing agents and the like.

The term "urea" is meant to encompass urea in all of its commercial forms, including those containing: urea hydrolysis products, including ammonium carbonate and ammonium bicarbonate; urea dimers and polymers, such as biuret; urea adducts and urea condensation products; amines, such as melamine, triethyl amine and ethanol amine; and the like. Typically, the commercial form of urea will consist essentially of urea, containing 95% or more urea or an aqueous solution containing urea of this purity.

Aqueous solutions of urea can be employed up to their solubility limits. Typically, the aqueous solution will contain from about 2 to about 65% reagent based on the weight of the solution. A narrower range is from about 25 to about 50%, e.g. about 35%. The invention enables utilizing urea to maximum advantage without the usual concerns of ammonia (also, HNCO and CO) or the concerns of line and nozzle plugging associated with urea hydrolysis or pyrolysis. Concentrated solutions are preferred because they limit the amount of water that must be stored, transported and vaporized.

The urea can be stored in any of the above forms or it can be stored dry in a canister. When stored dry, water is passed in contact with the urea as needed to prepare a solution. In this manner the solution concentration can be varied from near saturation (to minimize water storage and use) or to any concentration suitable for a vehicle or stationary installation. It will be desired in many circumstances to provide heaters for the water and/or urea solution storage to prevent freezing or to reduce reaction time in the gasification chamber. Likewise, it may be useful to employ antifreeze materials.

Reference is made to FIG. 1, which illustrates in block diagram form, one embodiment of the invention. The invention enables utilization of aqueous solutions of urea and like nitrogenous $NO_x$-reducing reagents in place of ammonia for SCR-$NO_x$ reduction in a manner that avoids wetting or forming solid deposits on the catalyst or forming deposits that can plug the solution feed and injector system.

The advantages related to preventing the catalyst from being wet or having deposits form on it, are achieved by introducing the urea solution into a heating unit under an elevated pressure, typically greater than 50 psi. The temperature, $T_1$, and the pressure in the heating unit are maintained sufficiently high to assure hydrolysis of the urea without the production of decomposition products in solid or molten form. To achieve the goal of hydrolysis it is necessary to have a temperature at least about 140° C. the pressure in the heating unit should be sufficient to prevent vaporization of water before hydrolysis is substantially complete, typically being within the range of at least about 50 psi, e.g., up to about 600 psi.

When the urea solution is heated under the appropriate conditions, hydrolysis causes formation of products including ammonium carbonate, ammonium bicarbonate and ammonium carbamate. When the concentration of the solution is greater than about 25%, these products are caused to precipitate due to the lower solubility of these materials as compared to urea. When the concentration is less than 25%, the hydrolysis products will remain in solution until sufficient of amounts of water in it are boiled off. The heat converts the hydrolysis products to ammonia, water (steam) and carbon dioxide. If the heating is sufficient in time and degree but does not reach pyrolysis conditions, all of the urea solution will be gasified and no residue will be left in the heating unit. If, on the other hand, the temperature is not adequately controlled, the water will evaporate leaving urea decomposition products in solid or molten form. Products of this type are highly undesirable and can foul equipment causing lines to plug—forcing shutdowns.

From the heating unit, the gases including ammonia are provided to an injector or control valve. A controller, e.g., 18, will control the feed of reagent gas as needed into the exhaust to provide sufficient ammonia for $NO_x$ reduction.

There are times during the operation of a diesel or other engine, that the exhaust temperature will be below the temperature required for operation of an SCR catalyst, e.g., 180° C. in the case of some platinum catalysts, 250° C. in the case of vanadia-titania catalysts, and 350° C. in the case of zeolite catalysts. During these times, the ammonia is preferably not introduced into the exhaust because it will simply pass through and foul the air. A variety of other catalysts are available and can be selected based on a particular apparatus configuration and the operating conditions that can be expected.

Figure 2:
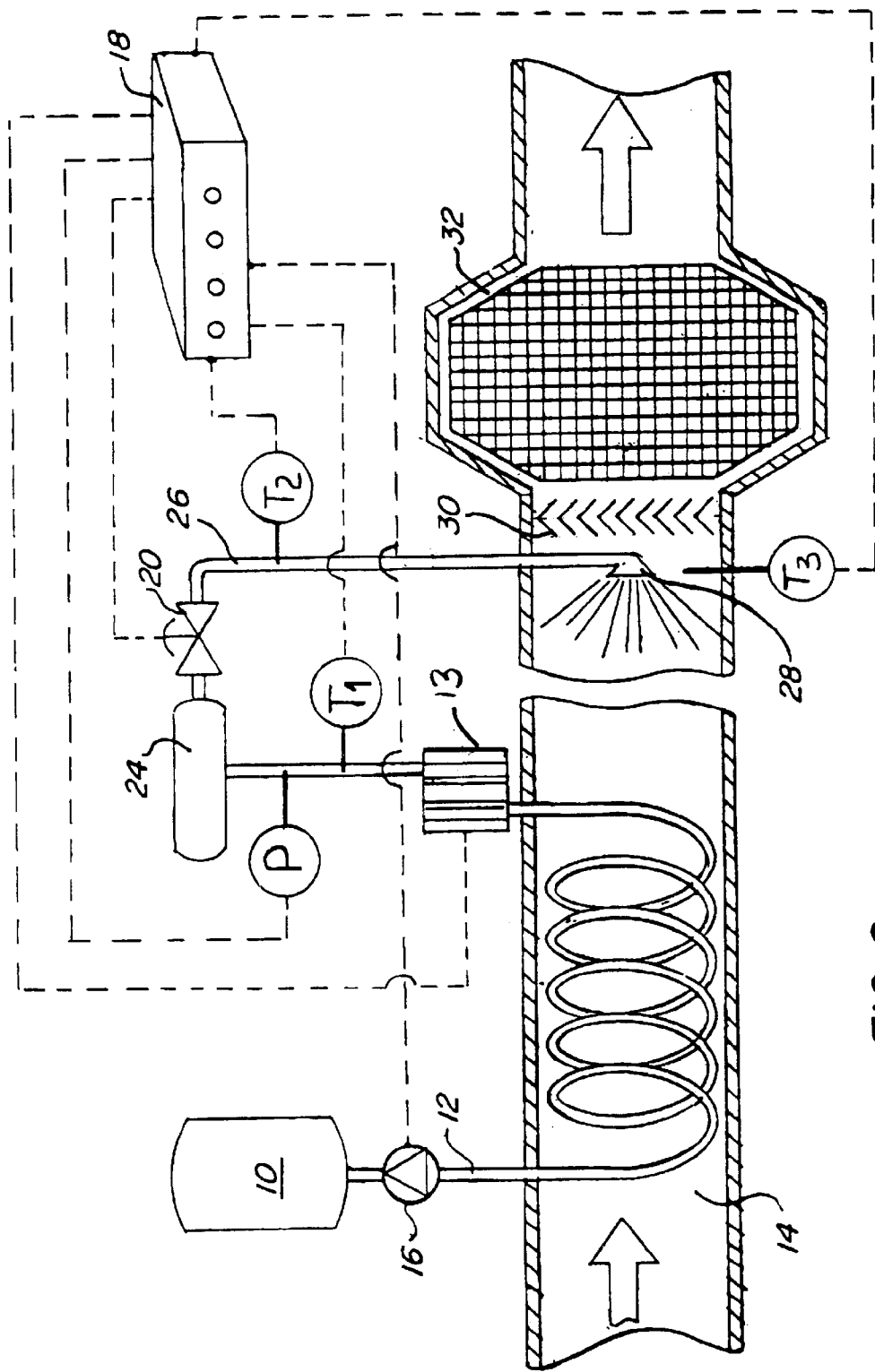
FIG. 2 is a schematic representation of one arrangement of apparatus according to the invention.

FIG. 2 schematically illustrates one embodiment of an apparatus of the invention. Urea solution is fed from tank 10 to line 12, which can serve as the sole or supplemental heating unit. Alternatively, optional heater 13 can be the sole or supplemental heating unit. The line 12 is shown coiled within the exhaust pipe 14 of an engine (not shown) wherein the hot exhaust gases can provide heat to the solution within line 12. In other embodiments, the heater 13 supplies some or all of the heat. A pump 16 provides metered feed and pressurizes the line to an elevated pressure.

A pressure gage is noted for the purpose of sensing the pressure in line 12 following the heating section within the exhaust pipe 14. The pressure gage generates a signal representative of the pressure and feeds this signal to controller 18. The controller receives this and other measured parameters (e.g., $T_1$, $T_2$ and $T_3$) and generates control signals to regulate the operation of pump 16 and valve 20. The temperature of the exhaust gases should be sufficient to cause hydrolysis of the urea and complete evaporation of the water following hydrolysis such that only gases exit line 12 through valve 20.

A small, optional surge vessel 24 is shown to receive the gases, including ammonia, exiting line 12. Ammonia-containing gas is then fed via line 26 and valve 20 and nozzle 28, which can be a simple low-pressure nozzle or a high-pressure injector. For low-pressure introduction, if that is preferred, mixing is not achieved by the energy of the gas itself and the provision of suitable mixing means 30 will be advantageous. Among the specific mixing means are propeller devices, multiple spaced injection ports or nozzles, a porous distribution ring, a line with multiple, spaced orifices, a mist eliminator, an uncatalyzed support, a diesel particulate trap or a static mixer of other design. The optional mixer or other distribution device can be positioned between the gasification chamber and the $NO_x$-reduction catalyst in chamber 32. An injector device for high-pressure introduction, if employed, of the gas from line 12 and vessel 24 can be of any suitable type, such as those of the kind designed to inject methane or propane gases into engines that run on those fuels. When such an injector is employed, control signals from the controller 18 are sent to operate it.

It is an advantage of the invention that, due to the complete gasification of the urea solution, the point(s) of introduction can be close-coupled with the catalytic unit. Another advantage of the invention is that by maintaining the presence of water during hydrolysis, all urea is hydrolyzed without the production of solids or molten materials of a type that could foul lines, valves or other equipment. Yet another, and significant, advantage of the invention is that the gases produced (other than water vapor) are essentially ammonia and carbon dioxide—not carbon monoxide and/or HNCO which are produced when urea is decomposed without the presence of sufficient water. Prior art technologies require the use of an oxidation catalyst to assure against the pollution caused by these entities.

FIG. 2 illustrates a control system of a type useful to maintain the proper level of reagent introduction (i.e., dosage). The controller can also modulate the flow of reagent gases either by modulating the valve or injector(s) or by pulsing the valve or injector(s). An auxiliary heating unit for gasifying the urea solution can be provided and run constantly or only upon a signal generated by a control system monitoring one or more engine, exhaust and/or urea solution parameters. The temperature of the exhaust is one parameter of importance. The ammonia should not be introduced into exhaust when the exhaust temperature is too low for the effective temperature range for the selected catalyst. Engine load, as represented by one or more suitable parameters, such as engine speed, throttle position or injection system settings, are also key parameters, and one of these or like factor can be monitored to determine the amount of $NO_x$ being generated and the need for reagent feed to the heating unit or its hydrolysis products fed to the exhaust gases.

It is a distinct advantage of the invention that the controller for the process of the invention can be integrated with and be a function of either an original equipment or retrofit engine management system (EMS). By taking advantage of sensors for various engine and other operational parameters, the broadest control capability for the invention can be achieved, It is an advantage of the invention that the introduction of the reagent in gaseous form provides an ability to closely control reagent dosing. It is also an advantage that the usually-occurring spikes or transients in $NO_x$ levels can be better tracked with gaseous reagent that does not require time to decompose. It is another advantage of the invention that the temperature of the urea solution can be controlled to prevent line or injector plugging due to solid or molten decomposition products of urea forming either during decomposition of the urea or condensation of its products. It is a further advantage of this aspect of the invention that the ammonia can be injected into the exhaust gases at a temperature and pressure to assure effective SCR, without the need to store ammonia on board a vehicle.

It is yet another advantage of the invention that the gaseous reagent can be introduced in close-coupled relation to the SCR catalyst. This has the advantage of enabling the smallest possible equipment size—saving materials and weight. The use of the gaseous reagent eliminates many of the prior art fouling concerns. It also permits introduction of reagent and location of the SCR catalyst nearer the engine where the exhaust gas achieves operational temperature most rapidly. The invention has the added advantage that the gaseous reagent can be easily introduced into the exhaust between the exhaust valves of the engine and a turbocharger exhaust turbine. This advantageously mixes the reagent with the exhaust at the highest possible temperature and at a point where the turbine can effect uniform mixing.

The reagent can be fed into the exhaust in response to a feed-forward controller in response to a number of measured parameters, including: fuel flow, throttle setting, engine speed, rack setting, intake air temperature, barometric pressure, intake air humidity, exhaust gas temperature and/or other parameters effective for particular engines. In addition, to the extent that sensors are available, trim or feed back control can be provided based on residual gas species following the catalyst, e.g., the level of $NO_x$, HC or CO. If desired, feedback control can be employed to trim the system in response to residual levels of ammonia, other gas species, or any other measurable engine or exhaust gas property.

The active species formed by the hydrolysis and gasification of the urea are introduced into the exhaust gases in an amount sufficient to provide the degree of $NO_x$ reduction desired. The desired amount can be dictated by regulation, engine design requirements or other criteria, Typically, a molar ratio of the active species to the baseline nitrogen oxides level (by which is meant the pre-treatment level of $NO_x$ in the effluent) of at least about 0.3:1 will be employed. More narrowly, the reagent is supplied to provide a molar ratio of active species to baseline nitrogen oxides of about 0.5:1 to about 1:1. The reagent levels or target $NO_x$ concentrations in the exhaust can be preprogrammed into the controller based on tested values for given fuel flows and related parameters, or sensors and related controls can be provided to provide real-time readouts. A sensor means might be provided to correct preprogrammed values by feedback control.

It is possible to provide a catalyst suitable for aiding the hydrolysis of the urea. Among the suitable hydrolysis catalysts are ones that comprise a material selected from the group consisting of phosphoric acid and acid phosphates, alkali metal hydroxides and carbonates, such as sodium hydroxide, potassium hydroxide, sodium carbonate, potassium carbonate, alkali metal silicates, alkaline earth metal hydroxides and oxides, aluminum hydroxide and oxides, and mixtures of two or more of these. See also U.S. Pat. No. 4,997,631 to Hofmann, et al., PCT application WO 92/02291 to von Harpe, et al., U.S. Pat. No. 5,139,754, Hofmann, Sun and Luffglass, U.S. Pat. No. 5,281,403 to Jones and JP HEI 2-191,528 to Ebina for a further listing of catalysts and techniques. See also, EP 615,777. Catalysts which comprise water-soluble materials can be added to or blended with the urea prior to being introduced into the heating unit or can be present or comprised in the heating unit.

The SCR catalyst used is one capable of reducing the effluent nitrogen oxides concentration in the presence of ammonia. These include, for instance, activated carbon, charcoal or coke, zeolites, vanadium oxide, tungsten oxide, titanium oxide, iron oxide, copper oxide, manganese oxide, chromium oxide, noble metals such as platinum group metals like platinum, palladium, rhodium, and iridium, or mixtures of these. Other SCR catalyst materials conventional in the art and familiar to the skilled artisan can also be utilized. These SCR catalyst materials are typically mounted on a support such as a metal, ceramic, zeolite, or homogeneous monolith, although other art-known supports can also be used.

Among the useful SCR catalysts are those representative prior art processes described below. Selective catalytic reduction processes for reducing $NO_x$ are well known and utilize a variety of catalytic agents. For instance, in European Patent Application WO 210,392, Eichholtz and Weller discuss the catalytic removal of nitrogen oxides using activated charcoal or activated coke, with the addition of ammonia, as a catalyst. Kato et al. in U.S. Pat. No. 4,138,469 and Henke in U.S. Pat. No. 4,393,031 disclose the catalytic reduction of $NO_x$ using platinum group metals and/or other metals such as titanium, copper, molybdenum, vanadium, tungsten, or oxides thereof with the addition of ammonia to achieve the desired catalytic reduction. See also EP 487,886, which specifies a $V_2O_5/WO_3/TiO_2$ catalyst with a working range of 220 to 280° C. Other catalysts based on platinum can have operating temperatures even lower, e.g., down to about 180° C.

Another catalytic reduction process is disclosed by Canadian Patent 1,100,292 to Knight, which relates to the use of a platinum group metal, gold, and/or silver catalyst deposited on a refractory oxide. Mori et al. in U.S. Pat. No. 4,107,272 discuss the catalytic reduction of $NO_x$ using oxysulfur, sulfate, or sulfite compounds of vanadium, chromium, manganese, iron, copper, and nickel with the addition of ammonia gas.

In a multi-phased catalytic system, Ginger, in U.S. Pat. No. 4,268,488, discloses exposing a nitrogen oxides containing effluent to a first catalyst comprising a copper compound such as copper sulfate and a second catalyst comprising metal combinations such as sulfates of vanadium and iron or tungsten and iron on a carrier in the presence of ammonia.

The effluent containing the gasified reagent is most preferably passed over the SCR catalyst while the effluent is at a temperature between about 100° C. and about 500° C., preferably at least 300° C. In this manner, the active species present in the effluent due to hydrolysis and gasification of the reagent solution most effectively facilitates the catalytic reduction of nitrogen oxides. The effluent will contain an excess of oxygen. Use of the present invention with any of the above SCR catalysts (the disclosure of which are specifically incorporated by reference) reduces or eliminates the requirement for the transport, storage and handling of large amounts of ammonia or ammonium water.

Because the invention is compatible with other emission-reducing and fuel economy technologies, a number of hybrid processes become available to the engine designer, vehicle producer and retrofit market. For example, the fuel can be catalyzed with a suitable platinum group metal additive and/or auxiliary catalyst composition selected from the group consisting of compounds of sodium, lithium, potassium, calcium, magnesium, cerium, iron, copper, manganese, and mixtures, Among the compounds are any of those disclosed for example in prior U.S. Pat. No. Nos. 4,892,562 and 4,891,050 to Bowers and Sprague, 5,034,020 to Epperly and Sprague, 5,215,652 to Epperly, Sprague, Kelso and Bowers, and 5,266,083 to Peter-Hoblyn, Epperly, Kelso and Sprague, WO 90/07561 to Epperly, Sprague, Kelso and Bowers, and U.S. patent application Ser. No. 08/597,517 filed Jan. 31, 1996, by Peter-Hoblyn, Valentine and Sprague, hereby incorporated by reference. Where the application permits, a blend of these compounds can be used with one or more other platinum group metal compounds such as soaps, acetyl acetonates, alcoholates, β-diketonates, and sulfonates, e.g., of the type which will be described in more detail below.

The platinum group metal catalyst and/or other catalyst can be added in any manner effective for its intended purpose, such as by adding it to the fuel in bulk storage, to the fuel in a tank associated with the engine, or by continuous or intermittent addition, such as by a suitable metering device, into: the fuel line leading to the engine, or in the form of a vapor, gas or aerosol into the air intake, the exhaust gases before the trap, exhaust gases after the trap but before recirculation to the engine, or a mixing chamber or equivalent means wherein the exhaust gases are mixed with incoming air.

When employed, particularly in combination with particulate traps, platinum group metal catalyst compositions are preferably employed at concentrations of less than 2 parts by weight of platinum group metal per million parts by volume fuel (ppm). For the purposes of this description, all "parts per million" figures are on a weight to volume basis, i.e., grams/million cubic centimeters (which can also be expressed as milligrams/liter), and percentages are given by weight, unless otherwise indicated. Auxiliary catalysts are employed at levels effective for their intended purpose, preferably at levels of from 1 to 100 ppm of the fuel utilized, e.g., 10 to 60 ppm.

The above description is for the purpose of teaching the person of ordinary skill in the art how to practice the present invention, and it is not intended to detail all of those obvious modifications and variations of it which will become apparent to the skilled worker upon reading this description. It is intended, however, that all such obvious modifications and variations be included within the scope of the present invention which is defined by the following claims. The claims cover the indicated components and steps in all arrangements and sequences which are effective to meet the objectives intended for the invention, unless the context specifically indicates the contrary.

What is claimed is:

1. A method for reducing the emissions of $NO_x$ from a lean-burn engine having associated therewith an exhaust system having an exhaust passage leading to an SCR reactor effective for selective catalytic $NO_x$ reduction, comprising:

supplying an aqueous urea solution at a preset pressure of at least about 50 psi into a vessel having an inlet and an outlet;

heating the urea solution in the vessel at a temperature above the hydrolysis temperature for the urea solution to produce an ammonia-containing gas;

responsive to control signals related to engine load and temperature measured within the exhaust gas passage, introducing the ammonia-containing gas from said vessel into the exhaust passage wherein exhaust from said engine is measured to have an exhaust gas temperature effective for selective catalytic reduction; and passing the exhaust gas containing ammonia through an SCR reactor.

2. A method according to claim 1 wherein the urea solution contains from from about 25 to about 50% urea.

3. A method according to claim 1 wherein the temperature of the exhaust gases is within the range of from about 200 to about 650° C.

4. A method according to claim 1 wherein the urea solution is heated to a temperature of at least about 140° C.

5. A method according to claim 1 wherein the urea solution is maintained under a pressure of at least about 100 psi during heating.

6. A method according to claim 1 wherein the urea solution is heated in part by the exhaust and in part by an auxiliary heating means.

7. A method according to claim 1 wherein the urea solution is heated by transfer of heat from the exhaust as the sole source of heat.

8. A method according to claim 1 wherein the urea solution is heated by an auxiliary heating means as the sole source of heat.

9. A method according to claim 1 wherein the ammonia-containing gas is introduced into the exhaust between exhaust valves of the engine and a turbocharger exhaust turbine.

10. A method according to claim 1 wherein the ammonia-containing gas is introduced into the exhaust in close-coupled relation with the SCR catalyst.

11. A method according to claim 1 wherein introduction of the ammonia-containing gas into the exhaust is controlled by a controller integrated with an engine management system.

12. An apparatus for reducing the emissions of $NO_x$ from a lean-burn engine having associated therewith an exhaust system having an exhaust passage leading to an SCR reactor effective for selective catalytic $NO_x$ reduction, comprising:

means for supplying an aqueous urea solution at a preset pressure of from about 50 to 600 psi into a vessel having an inlet and an outlet;

means for heating the urea solution in the vessel at a temperature above the hydrolysis temperature for the urea solution to produce ammonia;

means for controlling introduction of ammonia from the vessel;

means for introducing the ammonia into the exhaust gas at an exhaust gas temperature effective for selective catalytic reduction; and means for passing the exhaust gas containing the ammonia through an SCR reactor.

13. An apparatus according to claim 12, further including:

means to sense the temperature with the exhaust gas;

means to generate a signal representative of the sensed temperature;

means to sense the pressure of ammonia gas;

means to generate a signal representative of the sensed pressure; and means to compare the generated signals to referenced values and generate a control signal for controlling urea feed to the means for heating the urea and the feed of ammonia to the exhaust gases.

* * * * *